United States Patent [19]

Melnick

[11] 4,398,431

[45] Aug. 16, 1983

[54] MECHANICAL POWER TRANSMITTING SYSTEM

[76] Inventor: Harry S. Melnick, 160 Steele Rd., West Hartford, Conn. 06119

[21] Appl. No.: 287,148

[22] Filed: Jul. 27, 1981

Related U.S. Application Data

[63] Continuation-in-part of Ser. No. 28,501, Apr. 9, 1979, abandoned.

[51] Int. Cl.$^3$ .................... F16H 19/06; E01C 19/30; E02D 7/00

[52] U.S. Cl. .................................... 74/61; 74/129; 74/812

[58] Field of Search .................... 74/61, 87, 812, 119, 74/129; 173/49; 175/56; 404/117; 209/366.5, 367

[56] References Cited

U.S. PATENT DOCUMENTS

| | | | |
|---|---|---|---|
| 547,737 | 10/1895 | Kelley et al. . | |
| 667,350 | 2/1901 | Ulrich et al. | 74/129 |
| 2,102,603 | 12/1937 | Pinazza | 74/61 |
| 2,144,382 | 1/1939 | Lincoln et al. | 74/61 |
| 2,266,594 | 12/1941 | Ertel | 74/61 |
| 2,700,542 | 1/1955 | Geyer . | |
| 2,831,353 | 4/1958 | Ongaro | 74/61 |
| 2,897,734 | 8/1959 | Bodine et al. | 74/61 |
| 2,958,227 | 11/1960 | Peterson | 74/61 |
| 2,972,895 | 2/1961 | Wilson | 74/61 |
| 3,056,306 | 10/1962 | Muller | 74/61 |
| 3,224,514 | 12/1965 | Hornstein et al. | 74/61 |
| 3,466,938 | 4/1969 | Wulff | 74/119 |
| 3,499,337 | 3/1970 | Muller | 74/61 |
| 3,505,886 | 4/1970 | Hill et al. | 74/61 |
| 3,564,825 | 2/1971 | Gould et al. | 74/61 |
| 3,672,643 | 6/1972 | Bodine | 74/61 |
| 3,865,501 | 2/1975 | Kniep | 175/56 |

FOREIGN PATENT DOCUMENTS

| | | | |
|---|---|---|---|
| 7431 | 4/1902 | Austria . | |
| 261378 | 3/1912 | Fed. Rep. of Germany . | |
| 449461 | 12/1912 | France . | |
| 547110 | 7/1922 | France | 74/812 |
| 290409 | 8/1953 | Switzerland . | |
| 890223 | 2/1962 | United Kingdom . | |
| 1412146 | 10/1973 | United Kingdom . | |

*Primary Examiner*—Lawrence J. Staab

*Attorney, Agent, or Firm*—McCormick, Paulding & Huber

[57] ABSTRACT

In a mechanical system including a rotatable drive member and a load, a power transmitting device utilizing centrifugal force is employed for connecting the drive member to the load. In the device sequentially occurring centrifugal forces of opposite direction and long duration are generated by one or more weight means driven by the drive member and constrained to move about an associated endless path fixed to a carriage or carrier that reciprocates under the influence of the centrifugal forces. The reciprocating carriage is in turn drivingly connected to a load which may either be a power absorbing device or a tool for working on some other material. The power transmitting device has the inherent ability to function as an automatic transmission or torque converter to cause an input force or torque to be applied to the load at relatively low speeds, and with small displacements of the carriage, when the load is heavy and at relatively higher speeds, and with large displacements of the carriage when the load is light. The power transmitting device is shown in various and different embodiments with carriages that reciprocate either along straight line paths or along circular paths.

31 Claims, 16 Drawing Figures

MECHANICAL POWER TRANSMITTING SYSTEM

CROSS-REFERENCE TO RELATED APPLICATION

This application is a continuation-in-part application of U.S. Ser. No. 028,501, filed April 9, 1979, now abandoned.

BACKGROUND OF THE INVENTION

This invention relates to power transmitting devices for connecting a rotatable drive member to a load, and deals more particularly with such a device generating and harnessing centrifugal force as a vital part of the power transmission scheme.

A general object of this invention is to provide a power transmitting device for connecting a rotatable drive member to a load and which device is non-stalling regardless of the heaviness of the load being driven. That is, even if the load becomes extremely heavy or completely stops, the drive member may continue to be rotated by the motor, engine or other power source without the motor or engine being loaded to the point of being stalled or damaged.

Another object of the invention is to provide a power transmitting device which inherently functions similar to an automatic transmission or torque converter causing force to be transmitted to the load at a speed consistent with the load while the drive member continues to be rotated at a substantially constant speed. That is, when the load is heavy force or torque is applied to the load at a relatively low speed, and when the load is light force or torque is applied to the load at a relatively high speed, while the speed of the drive member remains substantially constant for different loads.

Another object of the invention is to provide a power transmitting device which may be configured to drive either a load with a reciprocating input member or a load with a unidirectionally rotatable input member.

A still further object of the invention is to provide a power transmitting device of the foregoing character wherein the efficiency of the device increases with increases in the speed of the rotatable input member so that, for a given load, less power is required to drive the drive member as its speed increases.

Other objects and advantages of the invention will be apparent from the drawings and from the following detailed description of the preferred embodiments.

SUMMARY OF THE INVENTION

This invention resides in a power transmitting device for connecting a rotatable drive member to a load which may have either a reciprocating input member or a unidirectionally rotatable input member. More particularly, the invention resides in such a device having at least one weight means restrained to movement along a non-circular endless path with curved end segments, such as a path consisting of two parallel segments joined by two semicircular end segments. The weight means is distributed substantially uniformly along a continuous portion of the length of the path so that during each traverse of the path by the weight means the weight means first moves over one of the end segments of the path to produce a centrifugal force in one direction and subsequently moves over the opposite end segment of the path to produce a centrifugal force in the opposite direction. The weight means has a substantial length measured along its path of movement so that as it passes over each curved end segment the centrifugal force which it generates remains in existence for a relatively long period of time. Preferably, this length of the weight means is greater than the length of the semicircular end segment of its path and less than one-half the total length of the path. The long duration centrifugal forces produced by the weight means cause reciprocating movement relative to a frame of a carriage to which the path defining means is fixed, and the carriage is in turn drivingly connected to the input member of the load. The permitted length of stroke of the carriage along its path of reciprocation is quite long, at least as long as the radius of curvature of the curved end segments of the path of the weight means relative to the carriage, and preferably several times the length of such radius or more, and the drive for the weight means permits unimpeded movement of the carriage along the full length of such stroke, so that the carriage has a wide range of stroke lengths along which it may reciprocate and it will reciprocate at a stroke length matching its load-reciprocating with long stroke lengths under light load conditions and with shorter stroke lengths under heavier load conditions. The driving connection may consist either of a direct connection between the carriage and a reciprocating input member for the load or it may include a reciprocating motion to unidirectional rotary motion converter for connecting the reciprocating carriage to a unidirectionally rotatable input member for the load. Springs may also be used at one or both ends of the path of carriage reciprocation relative to the frame to engage the carriage during the end portions of some strokes to keep the carriage moving within a given range of movement relative to the frame.

DESCRIPTION OF THE PREFERRED EMBODIMENTS

Figure 1:
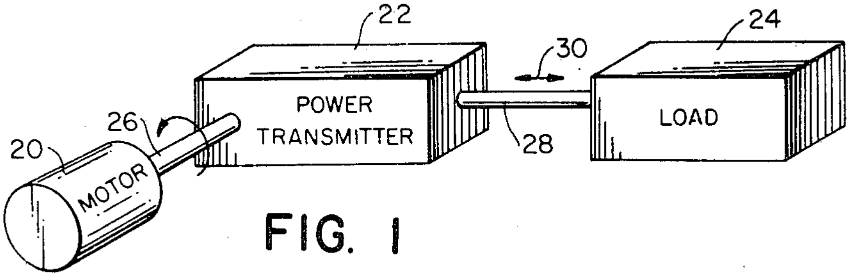
FIG. 1 is a schematic diagram showing a system incorporating the present invention.

FIG. 1 shows schematically a power transmitting system embodying the present invention and including a motor 20, a power transmitting device 22 and a load 24. The motor 20 may be an electric motor, gasoline engine or any other prime mover having a rotatable output for rotating a rotatable input shaft 26 of the device 22. The details of the device 22, in various different embodiments, is described below, but for the moment it will be noted that this device, among other things, serves to convert the rotary motion of its input shaft 26 to reciprocating motion of an output member 28.

The output member 28 of the power transmitting device 22 of FIG. 1 is shown as a simple shaft or rod. In an actual device this output member is a carriage, or a part fixed to such a carriage, reciprocated under the influence of alternately appearing oppositely directed centrifugal forces. In FIG. 1 the reciprocation of the output member is indicated by the arrow 30 which implies reciprocation of the member in a straight line fashion. In its broader aspects, however, the invention is not limited to such straight line reciprocation and instead, in some embodiments of the invention, as disclosed below, the output member may reciprocate in an angular fashion by rotating about a central axis.

In the system of FIG. 1 the reciprocating output member 28 of the device 22 is connected directly to the load 24 so that its reciprocating motion is imparted directly to the load. The load may take a wide variety of forms and may, for example, be a pump or other power absorbing device having a reciprocating input member. If the load is a pneumatic or hydraulic pump, the pressurized air or hydraulic fluid produced thereby may in turn be used to drive pneumatic or hydraulic motors for powering other devices. Also, the load 24 may be a tool such as a jack hammer bit or a ram for a compactor, impactor or pile driver which works in a vibrating manner on other material. That is, the power transmitting device 22 combined with a proper tool as the load 24 may be designed as a jack hammer and used to split rock, drill holes or to break up roads, floors or other structures. Likewise, it may designed with the proper tool to serve as a pile driver or as a compactor or vibrator for compacting earth, roadways, foundations, etc.

Figure 2:
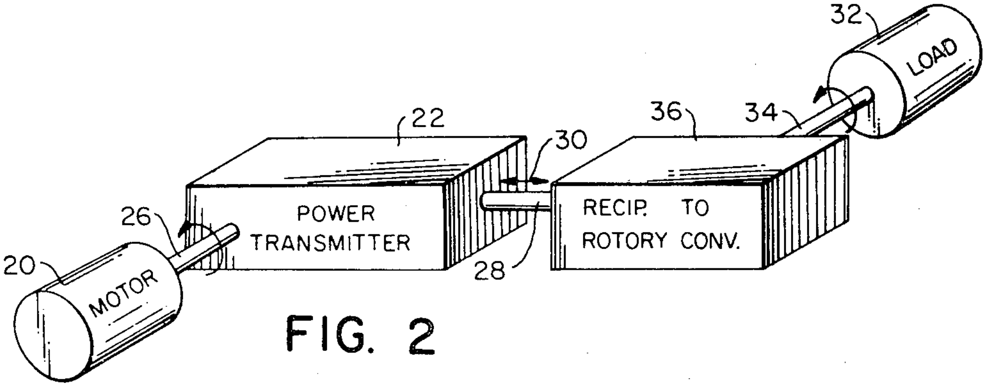
FIG. 2 is a schematic diagram showing another system incorporating the present invention.

FIG. 2 shows the invention embodied in a power transmitting system wherein the driven load 32 has a unidirectionally rotatable input member 34. The system of FIG. 2 is similar to that of FIG. 1 except that the reciprocating output member of the power transmitting device 22 is connected to a reciprocating motion to unidirectional rotary motion converting mechanism 36 which converts the reciprocating motion of the member 28 into a unidirectional rotary motion for the load input member 34.

Among other things, the power transmitting device 22 of FIG. 2 functions as a torque converter or automatic transmission with a very large variation of gear ratio to prevent stalling or overload of the motor 20 despite heavy increases in or stalling of the load 32 and to permit power to be delivered to the load at different speeds of the load input shaft 34 in accordance with the heaviness of the load as the motor 20 operates at a substantially constant speed or within a desirable speed range. Therefore, the load 32 may be anyone of a wide variety of devices, such as pumps, vehicles, generators, or machines with which such power transmission characteristics are desirable. The power transmitting device 22 of FIG. 1 also has similar characteristics.

Figure 3:
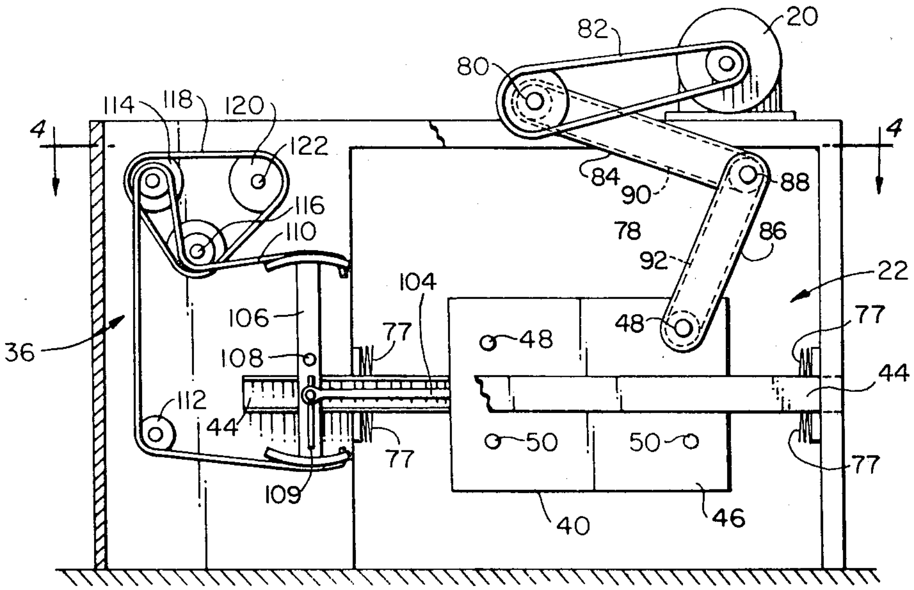
FIG. 3 is a somewhat schematic side elevational view of a power transmission system including components arranged according to the scheme of FIG. 2.
Figure 4:
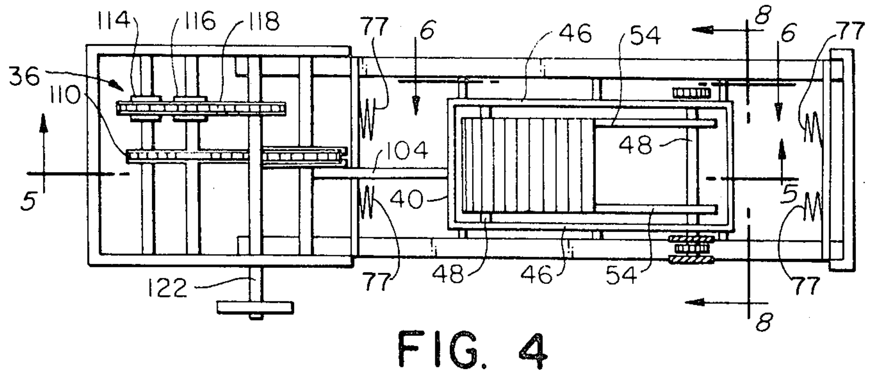
FIG. 4 is a top view of the system of FIG. 3 taken generally on the line 4—4 of FIG. 3.
Figure 5:
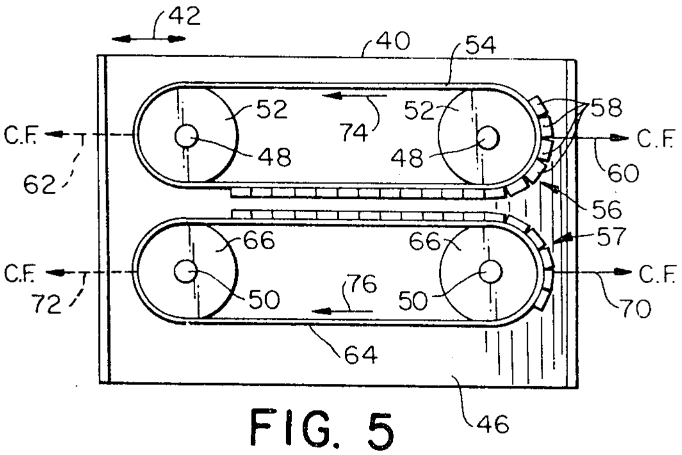
FIG. 5 is an elevational view taken on the line 5—5 of FIG. 4 and showing the centrifugal force generating means of the system of FIGS. 3 and 4.
Figure 6:
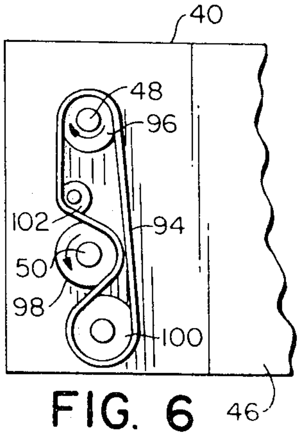
FIG. 6 is a view taken on the line 6—6 of FIG. 4.
Figure 7:
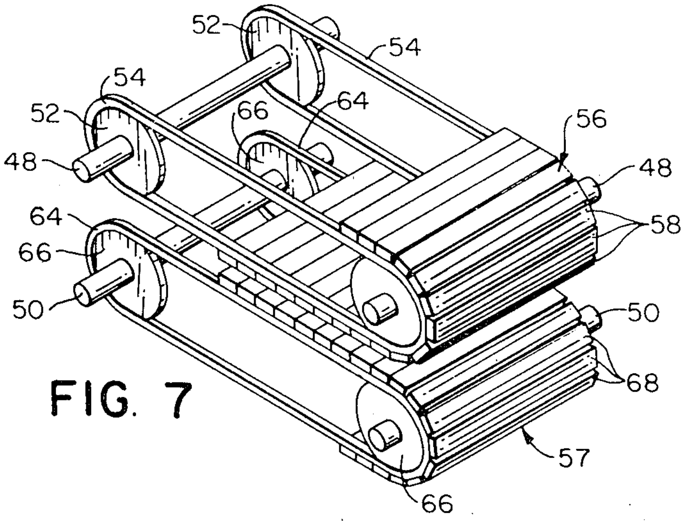
FIG. 7 is a perspective view showing further the centrifugal force generating mechanism of the system of FIGS. 3 and 4.

Turning to FIGS. 3 to 9, these figures show in detail a power transmitting system according to the system shown generally in FIG. 2. In this system the components of the system, except for the load which is not shown, are carried by a frame 38. The power transmitting mechanism 22 comprises a carriage 40 supported for horizontal straight line reciprocation, as indicated by the arrow 42, by two parallel horizontal rails 44, 44 fixed to the frame and a number of wheels 45, 45 mounted on the carriage 40 and traveling in the rails. The carriage 40 has two side walls 46, 46 rotatably supporting four transverse shafts 48, 48 and 50, 50 arranged as shown in FIG. 5 and FIG. 7. On each of the two shafts 48, 48 are fixed two circular members 52, 52 and over corresponding pairs of these two members 52, 52 are trained two endless flexible members 54, 54. Preferably, the circular members 52, 52 are toothed sprocket wheels and the endless flexible members 54, 54 are roller chains or the like cooperating with such sprocket wheels, but the circular members 52, 52 and the flexible endless members 54, 54 may take various other different forms without departing from the invention. The flexible endless members 54, 54 serve to carry and move a weight means, indicated generally at 56, consisting of a plurality of contiguous elongated weights 58, 58, such as metallic bars, extending between and attached to the two flexible members 54, 54.

The endless flexible members 54, 54, when one or the other of the shafts 48, 48 is rotated, therefore serve to drive and restrain the weights 58, 58 to movement along an endless path consisting of two straight parallel segments, defined by the distance between the two shafts 48, 48, and two semicircular end segments defined by the curvature of the circular members 52, 52.

The weights 58, 58 occupy a substantial portion of the length of the endless path along which they move. This length of path preferably is less than one-half of the total path length and greater than the length of each semicircular path end segment. Therefore, as will be evident from FIG. 5, when the weights 58, 58 are driven along their endless path, they first pass over one semicircular path end portion, without other weights at the said time moving over the other semicircular path end portion, and therefore create a first centrifugal force, such as indicated at 60 in FIG. 5 directed generally along the line joining the two centers of the semicircular end segments. Thereafter, the weights pass over the other semicircular path end portion and produce a second centrifugal force, indicated by the broken line 62 in FIG. 5, directed in the opposite direction along the line joining the centers of the two semicircular path end segments.

Since the weights 58, 58 are distributed over a substantial length of their path of movement it requires a substantial time for these weights to pass over each of the semicircular path end segments and therefore the centrifugal force 60 or 62 which is generated by such movement persists for a substantial duration of time.

This duration of time may be readily varied in the design of the apparatus by varying the length of the path occupied by the weights 58, 58. That is, the longer the length of the set of weights 58, 58 the longer will persist each of the alternately occuring centrifugal forces 60 and 62, assuming a constant speed of the shafts 48, 48. In particular, it will be noted that in contrast to the centrifugal force generated by an eccentric weight moving about a given axis and which in any given direction has a maximum or near maximum value throughout only a small angular fraction of each revolution of the weight, the illustrated device allows the centrifugal force 60 or 62 to persist at full maximum value while each shaft 48, 48 undergoes a very large angular movement which may be as much as one or more full revolutions.

It should be noted, however, that the exact shape of the path of weight movement is not essential to the broader aspects of the invention and other noncircular endless paths, beside the one shown, may be used provided such paths include two curved end segments generally opposite one another and which end segments have radii of curvature smaller than the remainder of the path in general so that oppositely directed and alternately appearing centrifugal forces are produced as the weight means moves repeatedly around the path.

In addition to the centrifugal force generator described above, the carriage 40 also carries a second similar generator comprised of a pair of endless flexible members 64, 64 trained over circular members 66, 66 fixed to shafts 50, 50 and carrying a weight means 57 consisting of weights 68, 68 similar to the weights 58, 58. The belts 64, 64 are driven in synchronism with the belts 54, 54 and the weights 68, 68 are arranged so that they pass over a semicircular end segment of their path when the weights 58, 58 pass over a corresponding semicircular end segment of their path so as to produce either a first centrifugal force 70 at the same time and in the same direction as the centrifugal force 60 or a centrifugal force 72 at the same time and in the same direction as the centrifugal force 62. As indicated by the arrows 74 and 76, the belts 64, 64 are driven in a direction opposite to the belts 54, 54 so that any vertical components of centrifugal force produced as the set of weights 58, 58 enters or leaves each semicircular end segment of its path will be balanced or canceled by a similar oppositely directed vertical component or force produced by the set of weights 68, 68.

As apparent from FIGS. 3 and 4 the rails 44, 44 support the carriage 40 for reciprocating movement relative to the frame 38 along an elongated path which is quite long in comparison to the range of movement normally associated with devices vibrated or agitated by eccentric weight vibrators. Preferably, such path of movement for the carriage 40 relative to the frame 38 is at least as long as the radius of curvature of the end segments of the path of movement of the weight means relative to the carriage, and more preferably is equal to several times or more the length of such end segment radius. For example, if the radius of the end segments around which the weight means moves is three inches the permitted length of movement of the carriage 40 along the rails 44, 44 may be two feet, or even more. Therfore, under light load conditions the carriage will move in long strokes along the rails 44, 44 and under heavier loads will move along shorter strokes. Also, as shown in FIGS. 3 and 4, spring means, such as the illustrated springs 77, 77, may be used to engage the carriage as it nears one end or the other of its permitted range of movement relative to the frame and to thereby keep the carriage within such range of movement. Also, as the carriage engages one set of springs such springs absorb the kinetic energy of the carriage and return it to the carriages on its return stroke. The springs may be used at one or both ends, or neither end, of the carriage path of movement depending on the particular type of load to which the carriage is connected.

At this point it should be noted that an essential part of the power transmitting means of this invention is that it includes, as described above, at least one weight means restrained to move in a noncircular endless path including two oppositely driven curved end segments with the weight having a substantial length along its travel path. The endless belts 54, 54 with the attached weights 58, 58, and the similar belts 64, 64 and weights 68, 68, are only one way in which this structure may be realized and various other realizations may be made without departing from the invention. As a further example, the weight means could consist of a group of balls or rollers received in an endless tube or channel and moved as a group along such tube or channel by a mechanical pusher or pressurized air.

The belts 54, 54 and 64, 64 of the power transmitting device 22 of FIGS. 4, 5 and 7 are driven by a motor 20 fixed to the frame 38, as shown in FIG. 3, with the power from the motor being delivered to the carriage 40 through a flexible arm drive 78. The motor drives a shaft 80 through a set of pulleys and a belt 82. The flexible arm drive 78 extends between the shaft 80 and one of the carriage shafts 48 and includes a first rigid arm 84 and a second rigid arm 86. The arm 84 is pivotally supported at its upper end for movement about the axis of the shaft 80 and the arm 86 is pivotally supported at its lower end for pivotal movement about the axis of the shaft 48. At their other ends the arms 84 and 86 are pivotal relative to one another about the axis of an intermediate shaft 88. By a belt 90 power is transmitted from the shaft 80 to the shaft 88 and by another belt 92 power is transmitted from the shaft 88 to the shaft 48. As the carriage moves along the rails 44, 44 the flexible arm drive 78 flexes at the axes of the shafts 80, 88 and 48 and the lengths of the arms 84 and 86 are such as to allow the carriage to move freely along the full length of its path relative to the frame 38 without any substantial interference or restraint from the motor 20 or the drive mechanism drivingly connecting the motor to the weights 58, 58 and 68, 68. For example, in the illustrated case the permitted stroke of the carriage may be two feet or more, as mentioned previously, and the flexible drive arm 78 accommodates such two feet or more of carriage movement.

Rotation of the shaft 48 by the belt 92 of the flexible arm drive drives the first set of weights 58, 58. The second set of weights 68, 68 is driven in unison with the first set by the arrangement shown in FIG. 6 consisting of a belt or chain or other endless flexible member 94 trained over a pulley 96 fixed to the shaft 48 and a pulley 98 fixed to the adjacent shaft 50 and two other idler pulleys 100 and 102, the shafts 48 and 50 accordingly being rotated in opposite directions to drive the belts 54, 54 and 64, 64 in opposite directions.

The alternately occurring and oppositely directed centrifugal forces generated by the weights 58, 58 and 68, 68 are applied to the carriage 40 and cause it to reciprocate in the straight line direction 42 of FIG. 3. As mentioned, the duration of these centrifugal forces may be varied by varying the length of the sets of weights. The frequency, duration and magnitude of these forces is also dependent on the speed of rotation of the shafts 48 and 50 which is controlled by the speed of the motor 20, and the frequency is also dependent on the spacing between the shafts 48, 48 and between the shafts 50, 50. The frequency of the forces is, however, quite small in comparison to that generally associated with eccentric weight vibrators and, for example, is generally less than 10 Hz and preferably less than 5 Hz.

It will also be understood that when the carriage 40 is connected to a relatively light load it will tend to travel through relatively long strokes of reciprocation, and when it is attached to a heavier load it will reciprocate through shorter strokes. For example, if the stroke length under light loads is about two feet the stroke length under heavier loads of normal working size will be about six inches to twelve inches. Under still heavier the stroke size will be yet smaller, and under extremely heavy loads the carriage motion may stop, but without stalling the motor 20. The magnitude of the centrifugal force is dependent on the rate at which the weights are forced to change their direction of travel as they pass over the semicircular end segments of their path. In addition to being dependent on the radius of curvature of the semicircular path end segments this magnitude is also dependent on the speed of the carriage. That is, when the carriage is forced by the load to stand still or to undergo only very short strokes of reciprocation, the actual path of the weights at each end segment, relative to the frame 38, will be almost precisely that of the semicircular path itself, thereby producing a maximum centrifugal force. On the other hand, if the carriage is moving through a relatively large stroke when weights move over an end segment the actual change in the direction of the weights, as seen from the frame, will beless than that dictated by the semicircular end segment itself and the centrifugal force will accordingly be reduced. Thus, the power transmitting device functions inherently to deliver a relatively light force at high speed when the load is light and to deliver a much larger force at lower speed when the load is heavy. Also, if the load becomes extremely heavy so as to completely or nearly stop the motion of the carriage 40 the weights will nevertheless continue to travel without stalling or overloading the motor 20.

Figure 9:
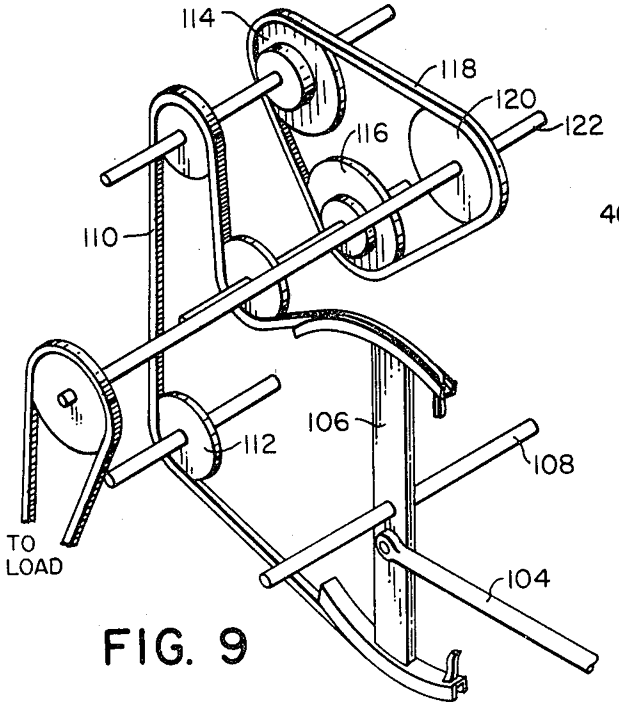
FIG. 9 is a perspective view showing the reciprocating to unidirectional rotary motion converting mechanism of the system of FIGS. 3 and 4.
Figure 8:
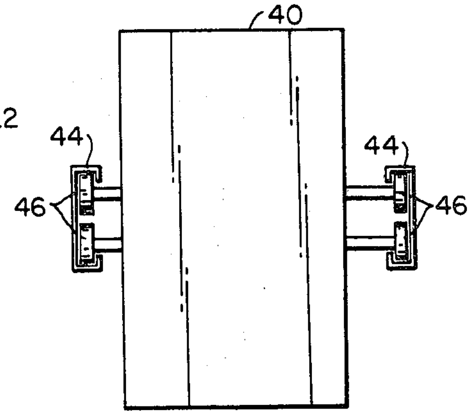
FIG. 8 is a view taken on the line 8—8 of FIG. 4.

As shown in FIGS. 3, 4 and 9 the reciprocating motion of the carriage 40 is delivered to the reciprocating to unidirectional rotary motion converter 36 by a rod 104 fixed to the carriage. The motion converting mechanism includes a pivotal crank 106 supported for pivotal movement by a shaft 108 and driven by the arm 104, the arm having a pin on its left-hand end received in a slot 109 in the crank 106. The opposite ends of the crank are connected to a flexible drive member 110 trained about a pulley 112 and also trained about the input members of two one-way clutches 114 and 116. The clutches 114 and 116 have output members in the form of pulleys or sprockets around which is trained an endless flexible member 118 also trained about a sprocket or pulley 120 fixed to an output shaft 122 adapted for connection to a uni-directionally rotatable load. In response to reciprocation of the carriage 40 the flexible member 110 is alternately driven in opposite directions by the crank 106. In one direction of this motion the clutch 114 is engaged to rotate its output member in one direction and in the opposite direction of this motion the clutch 116 is engaged to drive its output member in the same direction. The endless flexible member 118 is therefore driven unidirectionally as the member 110 reciprocates to accordingly rotate the output shaft 122 in one direction only.

Figure 10:
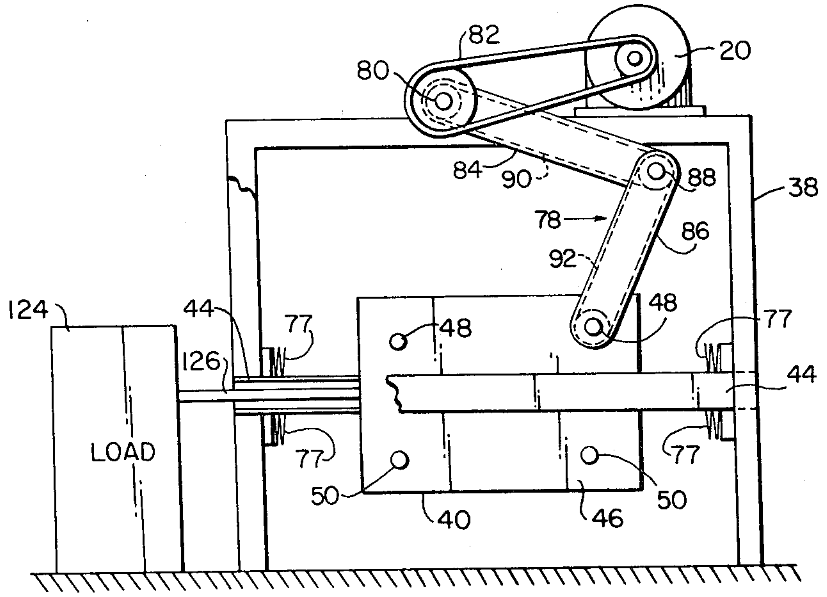
FIG. 10 is a somewhat schematic side elevational view of a power transmitting system having components arranged generally similar to the scheme of FIG. 1.

FIG. 10 shows a power transmitting system made in accordance with the scheme of FIG. 1. This system is identical to the one shown in more detail in FIGS. 3 to 9 except that the reciprocating motion to undirectional rotary motion converter 36 of the latter system is omitted and instead the carriage 40 is directly connected to a load 124 by a drive rod 126 fixed to the carriage. In this case, the load 124 is shown to be a stationary structure and may, for example, be a pump, machine, or any other device requiring a linearly reciprocating input. Also, the drive to the load is a double acting one like that of a steam engine piston with power delivered to the load on both the forward and return strokes of the drive member.

Also, as previously mentioned the load of FIG. 10 may be in the form of a tool utilizing the reciprocating or vibratory movement of the carriage for working on various materials or structures. In this case, the entire power transmitting system, including the tool may be designed to be portable so as to be capable of being moved to the job either by hand or by appropriate lifting or conveying equipment.

Figure 11:
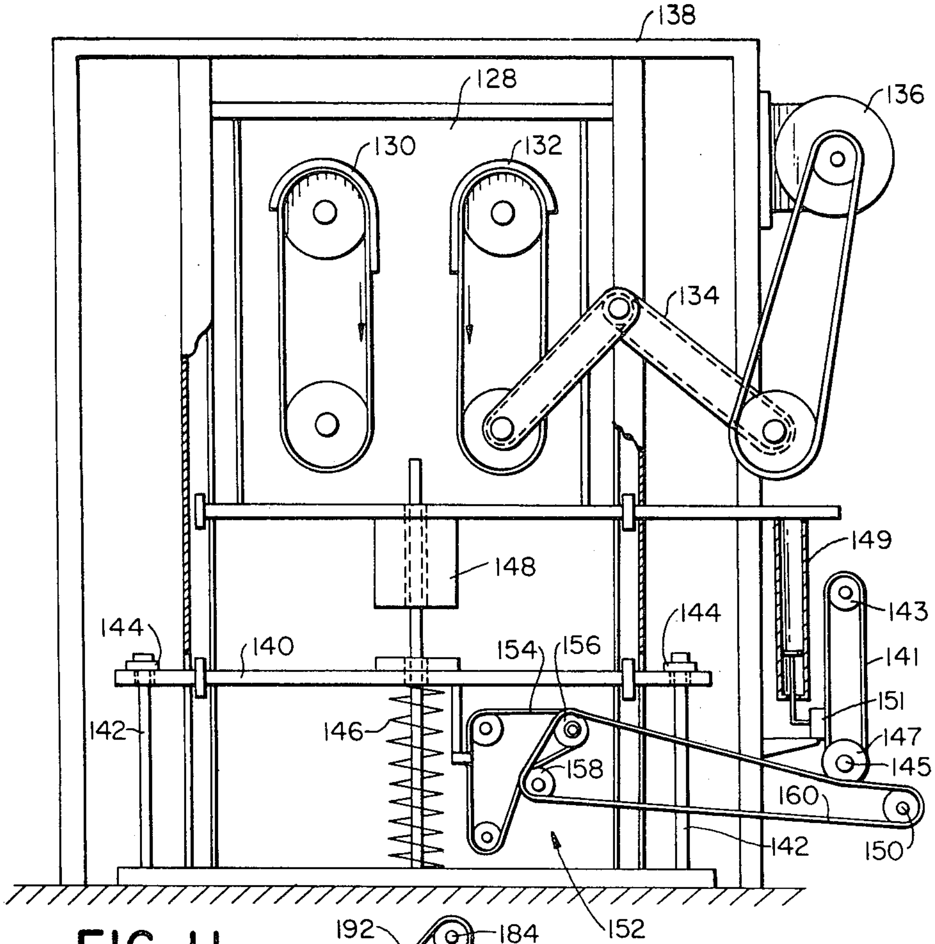
FIG. 11 is a somewhat schematic side elevational view of another power transmitting system embodying this invention.

FIG. 11 shows a form of the power transmitting system of this invention particularly well adapted to provide power in repetitive impulses of relatively high value. The system of this figure includes a carriage 128 having weights means 130 and 132 a flexible arm drive 134 and a motor 136. These parts and their associated structure are similar to the carriage 40, weight means 56 and 57, flexible arm drive 78 and motor 20 of the system of FIGS. 3 to 9 and need not be further associated in detail.

The carriage 128 is supported for vertical sliding movement relative to a frame 138, and when the weight means 130 and 132 are driven the carriage 128 reciprocates vertically because of the centrifugal forces generated by the two weight means. That is, when the weight means pass over the upper semicircular end segments of their paths of movement centrifugal forces are created which drive the carriage 128 upwardly. Likewise, when the weight means move over their lower semicircular path end segments downwardly directed centrifugal forces are produced which, together with gravity, drive the carriage downwardly.

Located below the carriage 128 is a drive part in the form of a horizontal bar 140 supported for vertical sliding movement by two guide rods 142, 142 and by the frame 138. Two stops 144, 144 on the upper ends of the rods 142, 142 limit upward movement of the bar 140 to an upwardly limited position, such as shown in FIG. 11, and a spring 146 resiliently urges the bar 140 upwardly toward engagement with the stops 144, 144. At the lower end of the housing 28 is a bumper 148.

In the operation of the system of FIG. 11, when the weight means 130 and 132 are driven upwardly directed centrifugal forces first lift the carriage 128 above the bar 140. Then, when downwardly directed centrifugal forces are next produced these forces, together with gravity, drive the carriage downwardly bringing the bumper 148 into contact with the bar 140 with a large impact or sledge hammer effect. The momentum or kinetic energy of the carriage and the remaining portion of the downwardly directed centrifugal forces are cushioned by the spring 146 as the bar 140 is driven downwardly by the bumper 148. Subsequently the energy stored in the compressed spring is returned to the carriage 128 and forces the carriage upwardly in a motion which is then assisted by the next appearance of the upwardly directed centrifugal forces. This process repeats itself for as long as the weight means are driven with the result that the bar 140 is repetitively struck and moved downwardly by the bumper 148 with each occurrence of such downward movement being followed by reverse upward movement effected by the spring 146.

The vertical reciprocating movement of the bar 140 is communicated to a load, represented by the shaft 150, by a reciprocating to unidirectional rotary motion converting device indicated generally at 152. This includes a first flexible drive member 154 fixed to the bar 140 and driving the input members of two one-way clutches 156 and 158 and a second flexible drive member 160 driven by the output members of the two clutches 156 and 158 and unidirectionally driving the output shaft 150.

If the weight of the carriage 128 is relatively light and the spring 146 relatively heavy the carriage may reciprocate vertically without having good cooperation with the bar 140. That is, the carriage at times may tend to reciprocate in the upper portions of the frame 138 so that during a down stroke it may either not engage the bar 140 or engage it with little momentum before being driven into its next upstroke by upwardly directed centrifugal forces. This can be alleviated by providing a means to resist movement of the carriage upwardly beyond a given point. Such means could be a spring at the upper portion of the frame arranged to resiliently resist upward carriage movement beyond a given point. It may also be a means such as shown in FIG. 11 for drivingly connecting the carriage to the load as it moves upwardly beyond a given point. This means includes an endless belt 141 trained over an upper sprocket 143 and a lower sprocket, not seen in FIG. 11, fixed to a shaft 145. The shaft is fixed to the input member of a one-way clutch 147 having its output member in driving engagement with the belt 160. Therefore, in one direction of movement of the belt 141, the clockwise direction in FIG. 11, its movement is drivingly connected to the load. The belt 141 is connected to the carriage 128 by a lost motion device 149 and a weight 151 urges it to the position shown in FIG. 11. During an upward stroke of the carriage after the carriage reaches a given point, the lost motion device engages so that further upward motion is connected to the load through the belt 141, the one-way clutch 147 and the belt 160. When the carriage next moves downwardly the weight 151 returns the belt 141 and the lost motion device 149 to their illustrated positions in preparedness for the next upstroke.

With regard to FIG. 11, it should also be noted that in some applications the bar 140 and other parts of the reciprocating motion to unidirectional rotary motion drive may be omitted and the bumper 148 or some other tool fixed to it may be used to deliver heavy impacts to some other work object or material. For example, the system in this configuration could be used as part of a pile driver or punch press.

Figure 12:
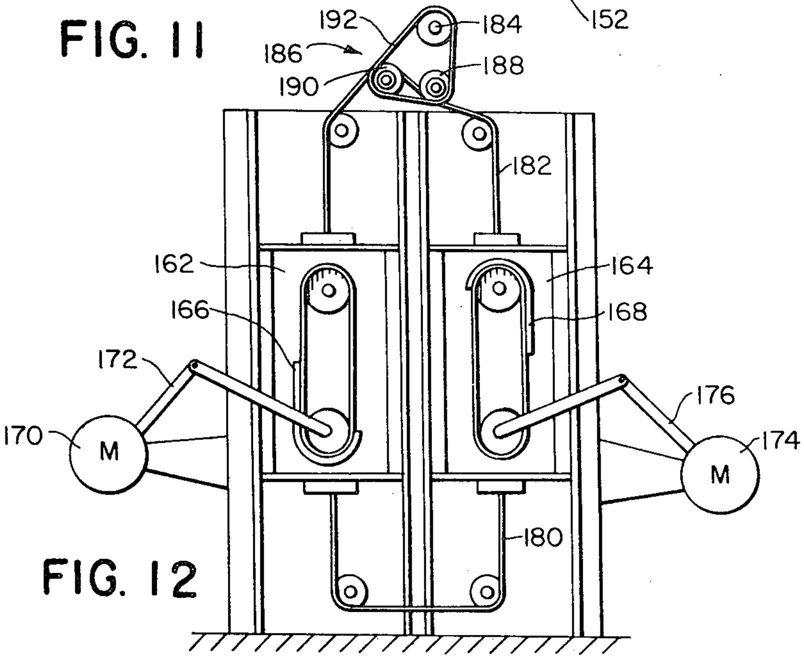
FIG. 12 is a somewhat schematic side elevational view of another power transmitting system embodying this invention.

A system using two vertically slidable carriages 162 and 164 is shown in FIG. 12. In this case, each carriage is shown as having only a single centrifugal force generator but two such generators for each carriage, as in the system of FIGS. 3 to 9, could be provided if desired. The centrifugal force generator of the carriage 162 includes a weight means 166 and that of the carriage 164 includes a weight means 168. Each of these two weight means 166 and 168, and the associated means for restraining it to an endless path of motion, is similar to the weight means 56 and its associated path restraining means of the FIGS. 3 to 9 system. The weight means 166 is driven by a motor 170 through a flexible arm drive 172 and the weight means 168 is driven by the motor 174 through a flexible arm linkage 176. The two motors are constrained to operate in synchronism and the weight means 166 and 168 are so arranged that when the weight means 166 passes over the lower semicircular end segment of its path the other weight means 168 passes over the upper semicircular end segment of its path, and vice versa. Therefore, when the weight means 166 produces a downwardly directed centrifugal force the weight means 168 at the same time produces an upwardly directed centrifugal force, and when the weight means 166 produces an upwardly directed centrifugal force the weight means 168 produces a downwardly directed centrifugal force. Of course, instead of the two motors 170 and 174 a single motor could also be used with a drive mechanism for driving both the weight means 166 and the weight means 168 simultaneously in the manner described.

Both carriages 162 and 164 are supported for vertical sliding movement by a frame 178 and are joined for synchronous movement by a flexible connecting means including a first flexible member 180 having its two ends connected to the bottoms of the carriages and a second flexible member 182 having its two ends connected to the tops of the carriages. It will therefore be apparent from FIG. 12 that the upwardly and downwardly appearing centrifugal forces produced by the weight means 166 and 168 cause the carriages 162 and 164 to reciprocate vertically in opposite phase to one another and thereby alternately move the flexible member 182 in opposite directions. The member 182 is in turn connected to a load, represented by the shaft 184, by a reciprocating motion to unidirectional rotary motion converting device, indicated generally at 186, similar to the corresponding mechanism of FIG. 11 and including two one-way clutches 188 and 190 having their input members driven by the flexible member 182 and another endless flexible member 192 connecting the output members of the clutches to the shaft 184.

Figure 13:
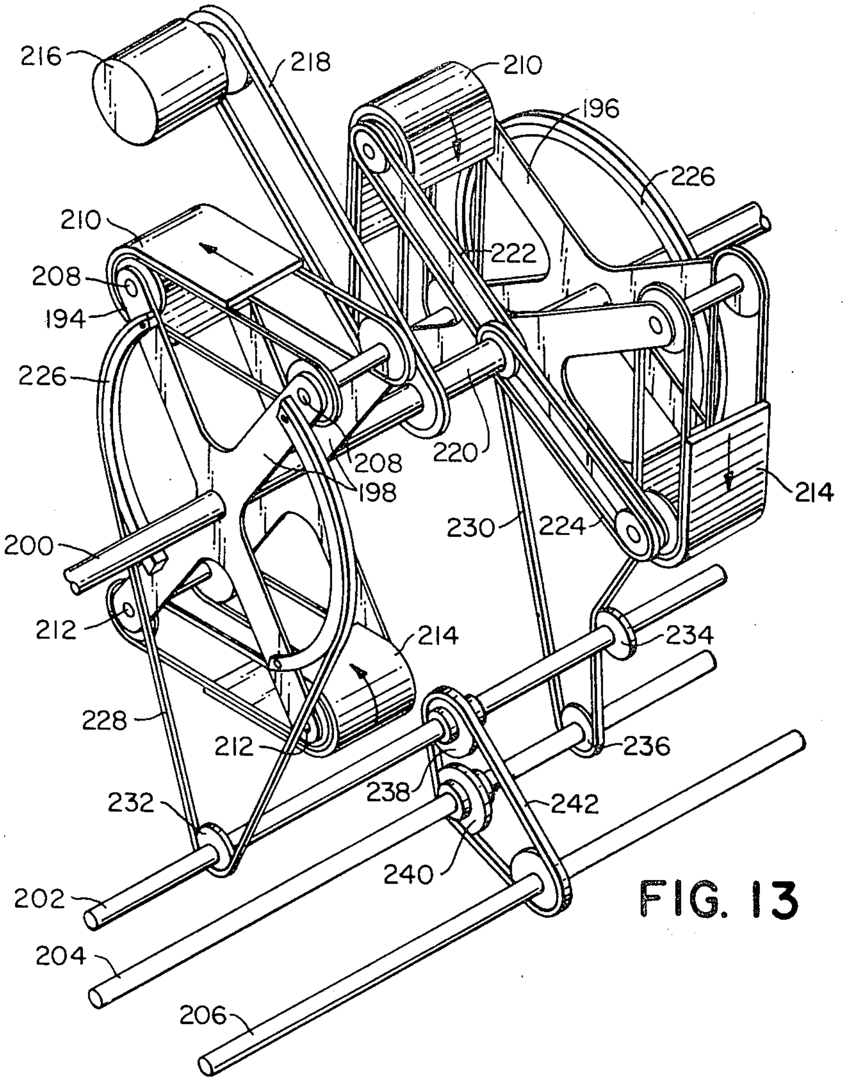
FIG. 13 is a schematic perspective view of another power transmitting system embodying this invention.
Figure 14:
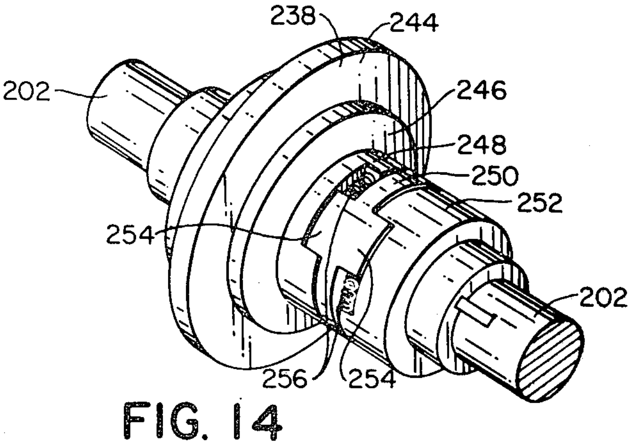
FIG. 14 is an enlarged perspective view of one of the combined one-way clutch and shock absorbing couplings employed in the system of FIG. 13.

In keeping with the invention, the reciprocating carriage of the power transmitting system need not necessarily be constrained to straight line reciprocating movement and instead may be supported for angular reciprocation about an arcuate or circular path. Such a latter system is shown in FIGS. 13 and 14. Referring to FIG. 13, the system there illustrated includes two angularly reciprocating carriages 194 and 196. Actually, only one of these carriages is required, but preferably both are provided to achieve a greater output and a counterbalancing of certain forces and torques to yield smoother operation. Both of the carriages and their associated weight means are of substantially the same construction and, therefore, similar parts of both carriages have been given similar reference numbers and need be described only once.

Considering the construction of the carriages, each includes two x-shaped side members 198, 198 rotatably supported for rotation about a central axis by a central shaft 200. This shaft, together with other shafts 202, 204 and 206 are suitably rotatably supported by an associated frame which has been omitted in FIG. 13 for clarity. At some radial distance from the shaft 200, the side pieces 198, 198 carry two shafts 208, 208 carrying sprockets and cooperating with a weight means 210 similar to the weight means 56 of the system of FIGS. 3 to 9. The two shafts 208, 208 are equally spaced from the axis of the shaft 200 and correspond to the shafts 48, 48 for the weight means 56 of FIGS. 3 to 9.

Diametrically opposite the two shafts 208, 208 the carriage side members 198, 198 also carry two other shafts 212, 212 which cooperate with a second weight means 214 similar to the first weight means 210, the two shafts 212, 212 being spaced the same distance from the central axis as the two shafts 208, 208. The two weight means of each carriage 194 and 196 are driven by a motor 216 through a belt 218 and a sleeve 220 rotatably surrounding the shaft 200. As shown for the carriage 196, the sleeve 220 has fixed thereto one sprocket which drives a belt 222 for driving the first weight means 210 and a second sprocket for another belt 224 driving the second weight means 214. Similar sprockets and belts are provided for driving the two weight means of the carriage 194, but these are hidden from view in FIG. 13.

For each carriage the two weight means 210 and 214 are driven in the same direction, as indicated by the arrows, and the weight means are so arranged that as the first weight means 210 passes over that one of its semicircular path end segments which produces a clockwise directed centrifugal force, relative to the shaft 200, the second weight means 214 passes over that one of its semicircular path end segments which also produce a clockwise directed centrifugal force, and, of course, when the first weight means next passes over its other end segment to produce a counterclockwise centrifugal force the second weight means at the same time passes over its other end segment to also produce a counterclockwise directed force. The clockwise forces therefore appear simultaneously and alternate with simultaneously appearing counterclockwise forces thereby causing the associated carriage 194 or 196 to reciprocate angularly about the axis of the shaft 200. Further, beacuse the carriages 194 and 196 are angularly movable about the axis of the shaft 200 the lengths of their paths of reciprocation are virtually unlimited and therefore may be as short as or as long as required to suit the associated load and other factors.

For each carriage the two weight means are so arranged that the two centrifugal forces produced by these weight means when they appear have the same clockwise or counterclockwise sense. However, as between the two carriages, the weight means are arranged so that when clockwise forces are produced in one carriage counterclockwise forces are produced in the other carriage and vice versa. Accordingly, the two carriages 194 and 196 reciprocate in directions opposite to one another and thereby produce a balancing of forces on the shafts 202 and 204 to avoid twists and strains on these shafts such as would be imposed thereon by the sudden starting and stopping of a single carriage.

The two carriages are connected to a load, represented by the shaft 206, by a sprocket or wheel 226 fixed to each carriage. The sprocket 226 of the carriage 194 drives a belt 228 drivingly connected with a sprocket 232 fixed to the shaft 202. The sprocket 226 of the carriage 196 drives a belt 230 which drives both a sprocket 234 fixed to the shaft 202 and another sprocket 236 fixed to the shaft 204.

Although the belt 228 of the first carriage 194 is directly connected only with the shaft 202, it also drives the shaft 204 by virtue of the two shafts 202 and 204 being drivingly connected with one another through the agency of the belt 230. Therefore, as the two carriages 194 and 196 reciprocate angularly about the shaft 200 both of the shafts 202 and 204 are angularly reciprocated. This motion is converted to unidirectional rotary motion by two one-way clutches 238 and 240 and an endless belt 242. The two clutches 238 and 240 have their input members connected respectively to the two shafts 202 and 204, and their output members are connected to the shaft 206 by the belt 242.

In some instances it may be desirable to provide a shock absorbing coupling between the reciprocating carriages and the load, and in the system of FIG. 13 such a shock absorber coupling may be provided by inserting for each of the one-way clutches 238 and 240 a device such as shown in FIG. 14. The device of FIG. 14 includes a clutch which is taken to be the clutch 238 of FIG. 13. This clutch has an output member 244 and an input member 246. The input member 246 is connected to a spring coupling including a driven member 248, an intermediate member 250 and a drive member 252. The drive member 252 is fixed to the shaft 202 and the driven member 248 is fixed to the input member 246 of the clutch. The intermediate member 250 has a number of teeth 254, 254 which are received in slots in the drive member 252 and driven member 248. When no load is transmitted from the driving member 252 to the driven member 248 springs 256, 256 urge the intermediate member 250 to the illustrated position. As the drive member 256 is rotated in the power transferring direction, clockwise in FIG. 14, the springs 256, 256 resiliently absorb some of the initial motion of the driving member 252 and thereby absorb the shock of a sudden start. Thereafter, the teeth 254, 254 engage the ends of the slots in which they are received and provide a positive driving connection between the driving member 252 and the driven member 248. When the shaft 202 thereafter rotates in the opposite or non-power transferring direction the springs 256, 256 return the intermediate member 250 to the FIG. 14 position.

Figure 15:
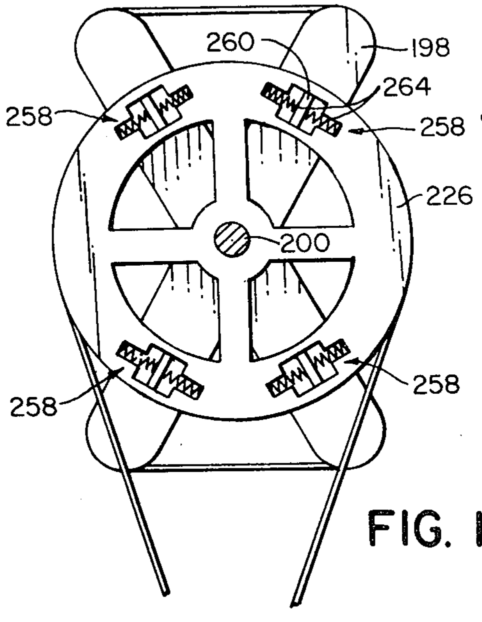
FIG. 15 is an elevational view showing an alternative construction for a portion of the system of FIG. 13.

An alternate form of providing a shock absorbing coupling in the system of FIG. 13 is shown in FIG. 15. As shown in this figure, the wheel 226 of each carriage is supported for angular movement on the center shaft 200 so as to be angularly movable relative to the adjacent carriage side member 198, and it is drivingly connected with such member by a number of spring couplings 258, 258. Each of these couplings includes a bar 260 fixed to the carriage side piece 198 and received in an opening 262 in the wheel 226. Associated with the bar 260 are two springs 264, 264, carried by the wheel 226, which tend to urge the wheel to a neutral angular position relative to the carriage side piece. The springs resiliently resist movement of the bar 260 in either direction from its neutral position, but after a small amount of travel in either direction from its neutral position the bar will engage the corresponding end of the opening 262 to thereafter provide a positive drive connection between the carriage and the wheel 226.

Figure 16:
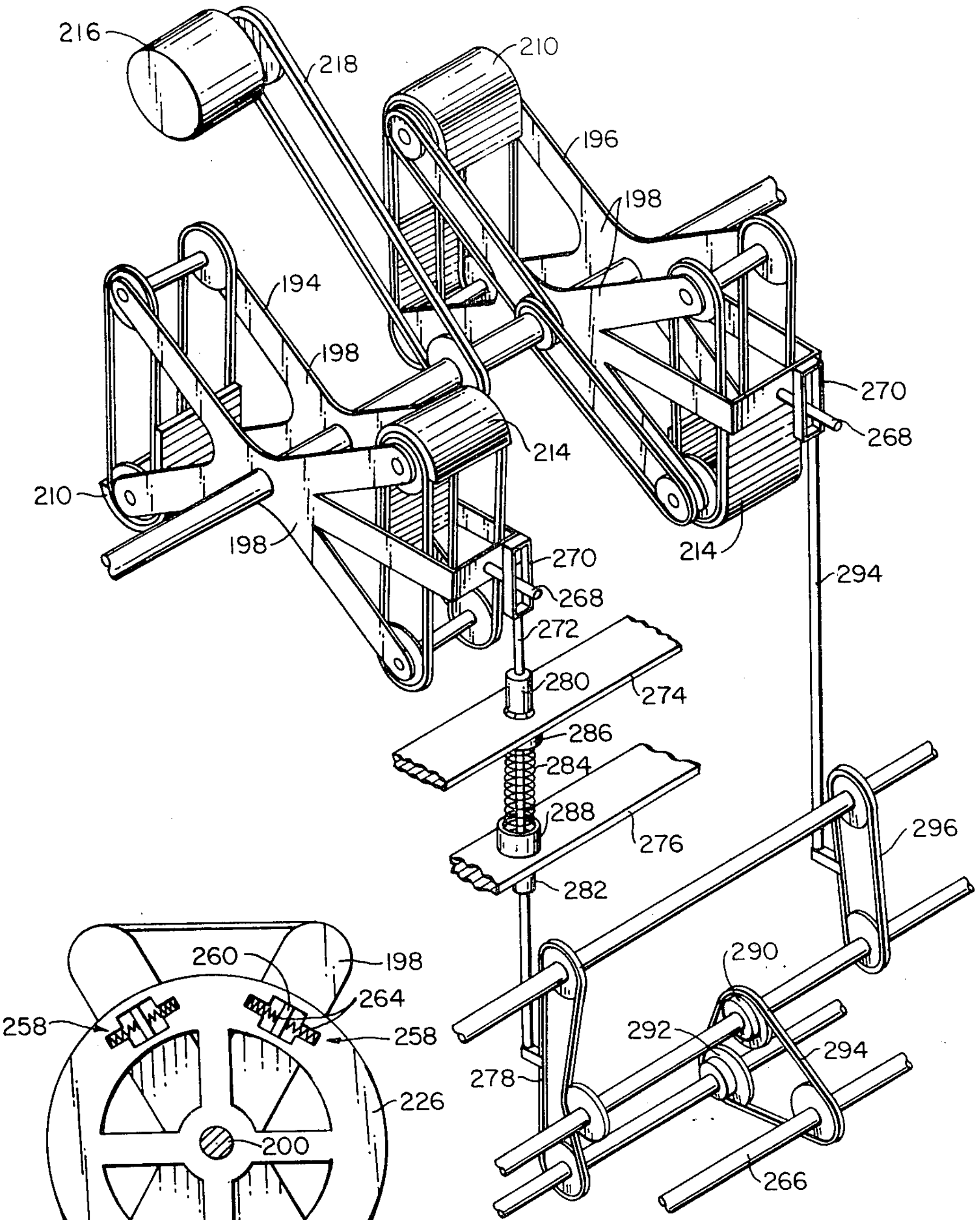
FIG. 16 is a schematic perspective view of a power transmitting system comprising still another embodiment of this invention.

FIG. 16 shows another power transmission system with angularly reciprocating carriages, but wherein the carriages are connected to a load through a drive means providing for some slack movement of the carriages independently of the load thereby allowing the carriages during each reversal of the direction of their movement to build up a certain amount of momentum before being coupled to the load.

Referring to FIG. 16, the two carriages and their associated centrifugal force generators are generally similar to the carriages 194 and 196 of FIG. 13 and, therefore, similar parts have been given the same reference numbers as in FIG. 13 and need not be described in further detail. The drive means for connecting the two carriages to the load, represented by the shaft 266, includes, for the carriage 194, a drive pin 268 fixed to the carriage and received in a yoke 270 fixed to the upper end of a drive rod 272. This drive rod extends through two fixed plates 274 and 276 and is connected at its lower end to an endless belt 278. Fixed to the rod 272 are two stops 280 and 282. Between the two plates 274 and 276 is a spring 284 surrounding the rod 272 and bearing against two end cups 286 and 288. These two end cups are unattached from the plates 274 and 276 and are aligned with openings in the plates 274 and 276 sufficiently large to allow the end stops 280 and 282 to freely pass through the plates and into engagement with the cups 286 and 288.

The two stops 280 and 282 are spaced from one another along the rod 272 by a distance greater than the spacing between the two end cups 286 and 288 so that the rod 272 has an intermediate range of movement throughout which it is free of the spring. However, when the rod is moved upwardly a sufficient distance the lower stop 282 encounters the lower end cup 288 of the spring so that further upward movement of the rod is resiliently resisted by the spring. Likewise, when the rod is moved downwardly a sufficient distance the upper stop 280 engages the upper end cup 286 so that further downward movement of the rod is resiliently resisted by the spring.

The movement of the drive pin 268 in the yoke 270 provides a range of movement for the carriage 194 throughout which it is able to move slackly or independently of the rod 272 and throughout which it is therefore completely uncoupled from the load. After the drive pin 268 strikes the upper or lower end of the yoke further movement of the carriage 194 is coupled to the load with such movement first being without resistence from the spring 284 and later with the spring resistance being added. When the motion of the carriage thereafter reverses, the reverse procedure takes place with the spring 284 adding its stored energy to the rod 272 to aid in driving it in the opposite direction. This smooths out the power delivery to the output shaft and makes the system less jerky.

The belt 278 driven by the rod 272 has its reciprocating motion converted to unidirectional rotary motion for the shaft 266 by two one-way clutches 290 and 292 drivingly connected with the output shaft 266 by an endless belt 294. The second carriage 196 is also drivingly connected with the load through a drive rod 294 having a yoke 270 at its upper end receiving a drive pin 268 fixed to the carriage. The drive rod 294 is also drivingly connected to a flexible belt 296. The rod 294, however, need not have its own spring device since that for the rod 272 also serves the rod 294 by virtue of the two rods being drivingly connected to one another through the two belts 296 and 278 and the intermediate shafts and sprockets.

I claim:

1. A system including a rotatable drive member, a load and a power transmitting device for drivingly connecting said drive member to said load, said device comprising a weight means, a carriage, means connected to said carriage restraining said weight means to movement along a path fixed relative to said carriage and consisting of two substantially parallel segments joined by two substantially semicircular end segments, said weight means being distributed substantially uniformly along a continuous portion of the length of said path, which portion is substantially less than the total length of said path, so that during each traverse of said path by said weight means a first centrifugal force, directed in one direction along the axis joining the centers of said two semicircular end segments, is produced as said weight means passes over the first of said two semicircular segments and a second centrifugal force, directed in the opposite direction along said axis, is produced as said weight means moves over the other of said two semicircular segments of said path, means drivingly connecting said drive member to said weight means to cause said weight means to be driven along said path in response to rotation of said drive member, a frame, means supporting said carriage for reciprocating movement relative to said frame along a given elongated path fixed relative to said frame and which path is at least as long as the radius of one of said semicircular end segments, said path of reciprocating movement being arranged generally in the same direction as said axis so that said carriage is urged to move along said elongated path relative to said frame by said centrifugal forces, a power source, means drivingly connecting said power source to said drive member so as to drivingly rotate said drive member without interfering with the movement of said carriage relative to said frame along said elongated path, and means for drivingly connecting said carriage to said load to cause said load to be driven in response to the reciprocating motion of said carriage, whereby said carriage is enabled to move through strokes of relatively large amplitude and duration.

2. A system as defined in claim 1 further characterized by said portion of the length of said path along which said weight means is distributed being greater than the length of each of said semicircular end segments of said path and less than onehalf the total length of said path.

3. A system as defined in claim 1 further characterized by said weight means and said means restraining said weight means to movement along a path consisting of two parallel segments joined by two semicircular end segments comprising first and second rotatable members rotatable about spaced parallel axes, a flexible endless member trained over said two rotatable members, and a plurality of weights located contiguous to one another along a portion of said endless flexible member and attached to said member for movement therewith.

4. A system as defined in claim 1 further characterized by said weight means and said means restraining said weight means for movement along a path fixed relative to said carriage and consisting of two parallel segments joined by two semicircular end segments comprising a first pair of circular members rotatable about a first axis and spaced from one another along said axis, a second pair of circular members rotatable about and spaced from one another along a second axis parallel to and spaced from said first axis, two flexible endless members each trained over a respective one of said first pair of circular members and a corresponding one of said second pair of circular members, a plurality of weights arranged contiguous to one another along a given portion of the length of said two flexible members, each of said weights extending transversely from one of said flexible members to the other, and means attaching each of said weights to both of said flexible members for movement therewith.

5. A system as defined in claim 1 further characterized by said means supporting said carriage for reciprocating movement relative to said frame restraining said carriage to motion along a substantially straight line path fixed relative to said frame.

6. A system as defined in claim 5 further characterized by said load having an input member which is reciprocable along substantially a straight line path, and said means drivingly connecting said carriage to said load being means directly connecting said carriage to said input member to cause said input member to move with said carriage.

7. A system as defined in claim 1 further characterized by said load having a rotatable input member, and said means drivingly connecting said carriage to said load including a reciprocating motion to unidirectional rotary motion converting mechanism.

8. A system including a rotatable drive member, a load and a power transmitting device for drivingly connecting said drive memebr to said load, said device comprising a weight means, a carriage, means connected to said carriage restraining said weight means to movement along a path fixed relative to said carriage and consisting of two substantially parallel segments joined by two substantially semicircular end segments, said weight means being distributed substantially uniformly along a continuous portion of the length of said path so that during each traverse of said path by said weight means a first centrifugal force is produced as said weight means passes over the first of said two semicircular segments and a second centrifugal force having a direction generally opposite to that of said first centrifugal force is produced as said weight means moves over the other of said two semicircular segments of said path, means drivingly connecting said drive member to said weight means to cause said weight means to be driven along said path in response to rotation of said drive member, a frame, means restraining said carriage to reciprocating movement relative to said frame along a given elongated path fixed relative to said frame under the influence of said centrifugal forces, and means for drivingly connecting said carriage to said load to cause said load to be driven in response to the reciprocating motion of said carriage, said means restraining said carriage to reciprocating motion restraining said carriage to motion along a substantially straight line path, said load having a rotatable input member, and said means drivingly connecting said carriage to said load including a reciprocating motion to unidirectional rotary motion converting mechanism, said reciprocating motion to unidirectional rotaty motion converting mechanism including a crank supported for rotation about a given axis, an arm connecting said carriage to said crank for angularly reciprocating said crank about said given axis in response to the reciprocation of said carriage along said straight line path, a series of rotatable members, a flexible member attached to said crank and trained about said series of rotatable members so that said flexbile member moves in one direction and the opposite as said crank is reciprocated in opposite directions about said given axis, two of the rotatable members about which said flexible member is trained being the input members of two one-way clutches, each of said one-way clutches having an output member, and said clutches being arranged so that when said flexible member moves in one direction one of said clutches is engaged to drive its output member in one angular direction and so that when said flexible member moves in the opposite direction the other of said one-way clutches is engaged to drive its output member in the same angular direction, and means drivingly connecting both of said output members of said two one-way clutches to said rotatable input member of said load.

9. A system as defined in claim 1 further characterized by a second weight means similar to said first mentioned weight means, means connected to said carriage restraining said second weight means to movement along a second path of a length and shape similar to that of said first-mentioned path and which second path is fixed relative to said carriage and consists of two parallel segments joined by two semicircular end segments, said two parallel segments of said second path being parallel to said two parallel segments of said first path, said first and second paths being further arranged so that the center of one of the semicircular segments of said second path is located in a plane substantially perpendicular to the parallel segments of said paths and containing the center of the corresponding semicircular portion of said first path and so that the center of the other of said semicircular segments of said second path is located in a plane generally perpendicular to said parallel segments of said paths and containing the center of the corresponding semicircular segment of said second path, and means drivingly connecting said drive member to said second weight means to cause said second weight means to be driven along said second path in response to rotation of said drive member and in sychronism with said first weight means so that said two weight means move in opposite directions about their respective paths but pass over their corresponding end portions at the same time.

10. A system as defined in claim 1 further characterized by said means supporting said carriage for reciprocating movement relative to said frame restraining said carriage to motion relative to said frame along a circular path.

11. A system as defined in claim 10 further characterized by said carriage being restrained to movement relative to said frame about a central axis fixed relative to said frame, and said path for said weight means being located radially outwardly from said central axis with the two centers of said two semicircular end segments of said path being located at substantially equal radial distances from said central axis.

12. A system as defined in claim 11 further characterized by said device further including a second weight means and a second path defining restraining means for said second weight means similar to said first mentioned weight means and to said first mentioned path defining restraining means, said second path defining restraining means being connected to said carriage substantially diametrically opposite from said first path defining restraining means, said means for drivingly connecting said drive member to said weight means being means driving said first and second weight means in synchronism along their respective paths in response to rotation of said drive member and so that as said first weight means passes over one of the end segments of its path to produce a centrifugal force causing rotation of said carriage in one direction about said central axis said second weight means passes over a corresponding one of the end segments of its path to produce a centrifugal force tending to rotate said carriage in the same direction about said central axis.

13. A system as defined in claim 12 further characterized by a second carriage supported for rotation relative to said frame about said central axis and spaced along said central axis from said first carriage, third and fourth path defining restraining means fixed to said second carriage at diametrically opposite positions relative to said central axis and which third and fourth path defining restraining means are generally similar to said first path defining restraining means, third and fourth weight means generally similar to said first weight means for movement respectively along said third and fourth path defining restraining means, said means for drivingly connecting said drive member to said weight means including means for driving said third and fourth weight means in synchronism with said first and second weight means so that as said first weight means passes one of the end segments of its path to produce a centrifugal force tending to rotate said first carriage in one direction about said central axis, said third and fourth weight means pass over corresponding end segments of said third and fourth paths to create centrifugal forces tending to rotate said second carriage in the opposite direction about said central axis, and means drivingly connecting said second carriage to said load.

14. A power transmitting system as defined in claim 1 further characterized by said means drivingly connecting said carriage to said load including a shock absorbing coupling.

15. A power transmitting system as defined in claim 1 further characterized by said carriage being supported for straight-line motion along a vertical axis, said path defining restraining means for said weight means being arranged relative to said carriage so that said centrifugal forces are directed generally along said vertical axis so as to tend to alternately raise and lower said carriage, said means for drivingly connecting said carriage to said load including a drive part located below said carriage and supported for vertical sliding movement, means limiting the upward movement of said drive part to an upwardly limited position, a spring means biasing said drive part upwardly towards said upwardly limited position and resiliently resisting its downward movement, said drive part being arranged to be engaged and moved by said carriage during its downward movement so that the downward momentum of said carriage and the accompanying downwardly directed centrifugal force is resisted by said spring means and so that thereafter said spring means aids the subsequently appearing upwardly directed centrifugal force in moving said carriage upwardly, and means drivingly connecting said drive part to said load.

16. A power transmitting system as defined in claim 15 further characterized by said carriage being free to move upwardly beyond said upwardly limited position of said drive part.

17. A power transmitting system as defined in claim 1 further characterized by said carriage being supported for straight-line motion along a vertical axis and said path defining restraining means for said weight means being arranged so that said centrifugal forces are directed generally along said vertical axis so as to tend to alternately raise and lower said carriage, a second carriage located adjacent said first mentioned carriage and supported for straight-line motion along another vertical axis, said second carriage having associated therewith a second weight means and a path defining restraining means for said second weight means similar to said weight means and said path defining restraining means of said first-mentioned carriage, said means for driving said first-mentioned weight means in response to rotation of said drive member including means for driving said second weight means in synchronism with said first weight means with said two weight means being so phased that when the centrifugal force generated by said first weight means is directed downwardly the centrifugal force generated by said second weight means is directed upwardly and vice versa, and a flexible connecting means connected to said two carriages and a plurality of rotatable members about which said flexible connecting means is trained for causing said two carriages to move in synchronism and for causing said flexible connecting means to be driven alternately in opposite directions, and said means for drivingly connecting said carriage to said load including means drivingly connecting said flexible connecting means to said load.

18. A power transmitting system as defined in claim 1 further characterized by said means for drivingly connecting said carriage to said load including a lost motion and spring coupling whereby said carriage throughout a portion of its reciprocating motion is free to move independently of said load and whereby said carriage is drivingly connected to said load through a spring throughout the remainder of its range of reciprocating motion.

19. A power transmitting system as defined in claim 1 further characterized by a driving member supported for sliding movement, and means including a spring means associated with said driving member whereby said driving member has a range of sliding movement including a middle portion at which said driving member is free to move independently of said spring means and two end portions on opposite sides of said mid-portion at which movement of said driving member away from said mid-portion is resiliently resisted by said spring means, said means for drivingly connecting said carriage to said load including means connecting said driving member to said carriage so as to be slidably reciprocated in response to the reciprocating motion of said carriage, and means drivingly connecting said spring means to said load.

20. A power transmitting system as defined in claim 19 further characterized by said means connecting said driving member to said carriage including a lost motion coupling allowing said carriage to move independently of said driving member over a portion of its range of movement.

21. A power transmitting system as defined in claim 1 further characterized by said means supporting said carriage for reciprocating movement relative to said frame restraining said carriage to motion relative to said frame about a central axis, and said means connecting said carriage to a load including a drive wheel also supported for rotation relative to said frame about said central axis adjacent to said carriage, a spring coupling between said carriage and said wheel, said spring coupling establishing a neutral position of said carriage relative to said wheel and resiliently resisting movement of said carriage relative to said wheel in either direction from said neutral position and said coupling also establishing two end stop positions on either side of said neutral position at which movement of said carriage realtive to said wheel is positively stopped, a flexible drive member trained over said drive wheel, and means drivingly connecting said flexible drive member to said load.

22. A power transmitting system as defined in claim 1 further characterized by said means supporting said carriage for reciprocating movement relative to said frame restraining said carriage to motion relative to said frame about a central axis, and said means connecting said carriage to a load including a drive wheel fixed to said carriage, a first flexible drive member trained over said drive wheel, two one-way clutches having input members driven by said first flexible drive member, said two clutches being arranged so that one is engaged when said flexible drive member moves in one direction and the other is engaged when said flexible drive member moves in the opposite direction, said clutches also having output members, a second endless flexible member driven by both of the output members of said two clutches, and means drivingly connecting said second endless flexible member to said load.

23. A power transmitting system as defined in claim 22 further characterized by a spring coupling connecting said first flexible member to each of said input members of said clutches, said spring coupling when said first flexible member starts to move in the direction to engage the associated clutch first providing a resilient spring connection between said flexible member and the associated clutch input member and thereafter providing a positive drive connection between said flexible member and said associated clutch input member.

24. A power transmitting system comprising a frame, a carriage, means supporting said carriage on said frame for reciprocating movement of said carriage relative to said frame along a given elongated path of reciprocation fixed relative to said frame, a weight means, means driving said weight means along an endless elongated path fixed relative to said carriage and having two curved end segments at opposite ends thereof, said weight means being distributed substantially uniformly along a continuous fractional portion of the length of said endless path, which portion is substantially less than the total length of said path, so that during each traverse of said endless path by said weight means a first centrifugal force, directed in one direction along the axis joining said two end segments, is produced as said weight means passes over the first of said two curved end segments and a second centrifugal force, directed in the opposite direction along said axis, is produced as said weight means passes over the other of said two curved end segments, said endless path being so arranged relative to said path of reciprocation that said axis along which said first and second centrifugal forces are directed is oriented in generally the same direction as said path of reciprocation so that said centrifugal forces drive said carriage in reciprocating movement relative to said frame along said path of reciprocation, said path of reciprocation having a length at least as great as the radius of curvature of one of said two curved end segments, and means utilizing said reciprocating movement of said carriage, whereby said carriage is enabled to move through strokes of relatively large amplitude and duration.

25. A power transmitting system as defined in claim 24 further characterized by said endless elongated path consisting of two substantially parallel segments joined by two substantially semicircular end segments.

26. A power transmitting system as defined in claim 24 further characterized by said means driving said weight means including a means connected to the carriage restraining the weight means to movement along said endless path, a rotatable drive member, means drivingly connecting said drive member to said weight means to cause said weight means to be driven along said endless path in response to rotation of said drive member, a power source, and means drivingly connecting said power source to said drive member so as to drivingly rotate said drive member without interfering with the movement of said carriage relative to said frame said elongated path.

27. A power transmitting system as defined in claim 24 further characterized by said portion of the length of said endless path along which said weight means is distributed being greater than the length of each of said end segments.

28. A power transmitting system as defined in claim 1 further characterized by said given elongated path of said carriage relative to said frame being at least as long as several times the length of the radius of one of said semicircular end segments.

29. A power transmitting system as defined in claim 24 further characterized by said path of reciprocation having a length at least as long as several times the length of the radius of curvature of one of said two curved end segments.

30. A power transmitting device as defined in claim 1 further characterized by a spring means at at least one end of the path of movement of said carriage relative to said frame for engaging said carriage to absorb its kinetic energy and to return such energy to said carriage on its return stroke.

31. A power transmitting device as defined in claim 24 further characterized by a spring means at at least one end of the path of movement of said carriage relative to said frame for engaging said carriage to absorb its kinetic energy and to return such energy to said carriage on its return stroke.

* * * * *